Figure 1:
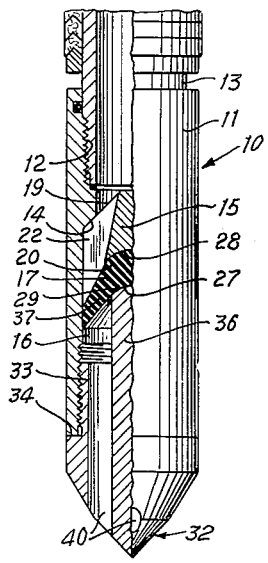

Feb. 27, 1962 L. L. CUMMINGS 3,022,796
CHECK VALVES
Filed March 25, 1958

INVENTOR
Leslie L. Cummings

BY
ATTORNEY

United States Patent Office 3,022,796
Patented Feb. 27, 1962

3,022,796
CHECK VALVES
Leslie L. Cummings, Houston, Tex., assignor to Otis Engineering Corporation, Dallas, Tex., a corporation of Texas
Filed Mar. 25, 1958, Ser. No. 723,840
11 Claims. (Cl. 137—454.6)

This invention relates to check valves and more particularly to check valves employing a resilient closure element.

This application is a continuation in part of my pending application Serial No. 514,427, filed June 10, 1955, now Patent No. 2,833,306.

An object of the invention is to provide a new and improved check valve.

Another object of the invention is to provide a check valve having a resilient closure element.

Still another object is to provide a check valve having a resilient cup shaped closure element and a metallic support and seating element for the closure element adapted to prevent undesired deformation of the closure element.

A further object of the invention is to provide a check valve having a cup shaped closure element and a support and seating element having a cup shaped recess for receiving the closure element.

A still further object of the invention is to provide a check valve having a cup shaped closure element, a support and seating element having a cup shaped recess for receiving the closure element and a retaining member for holding the closure element seated in the recess of the support and seating element whereby the closure element need not be provided with an aperture or bore through which a fastening means may pass to secure the closure element to the support and seating element.

Still another object of the invention is to provide a check valve having a resilient closure element, and a support and seating element having a recess for receiving the base of the closure element wherein the support and seating element is provided with a plurality of peripheral grooves or flow passages and wherein the closure element has a substantially frusto-conical intermediate surface which is engaged by the support and seating element and a substantially cylindrical outer sealing surface projecting forwardly from the frusto-conical surface which is adapted to engage a cylindrical surface to prevent flow between the cylindrical surface of the check valve and the cylindrical outer surface of the closure element.

Still another object is to provide a check valve which includes a housing having a longitudinal bore provided with an annular stop shoulder against which a closure element support and seating element may abut to prevent its movement in one direction, a closure element disposed in a recess of the support and seating element and a retaining means extending into the closure element and holding it against displacement from the recess.

A still further object is to provide a new and improved check valve wherein the closure element is cup shaped and is free of any apertures or bores whereby leakage of fluids therethrough is precluded.

A further object is to provide a new and improved closure element and a new and improved support and seating element therefor which is provided with a threaded bore in one end thereof, which does not extend through the support and seating element, for receiving the fastening element of the closure element whereby the closure element may be securely fastened to the support and seating element.

Figure 3:
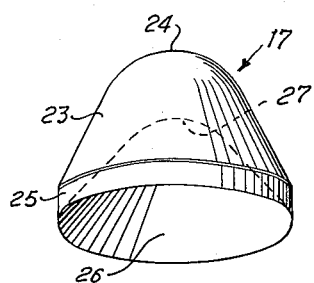
Figure 2:
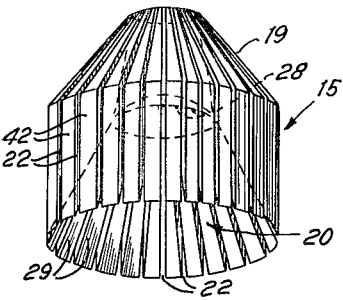
Figure 4:
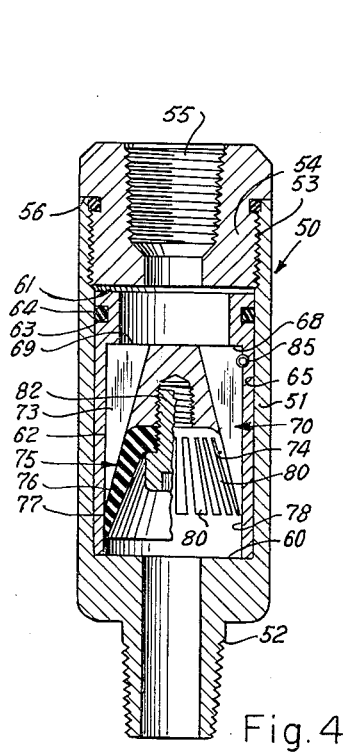
Figure 5:
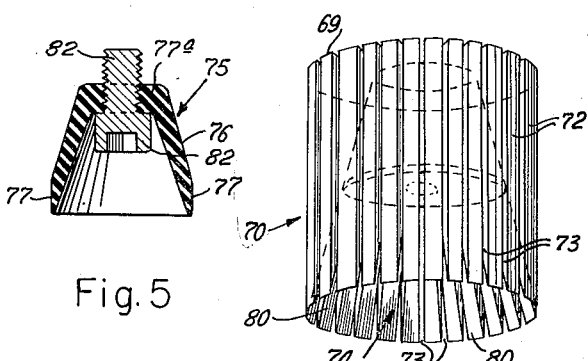
Figure 6:
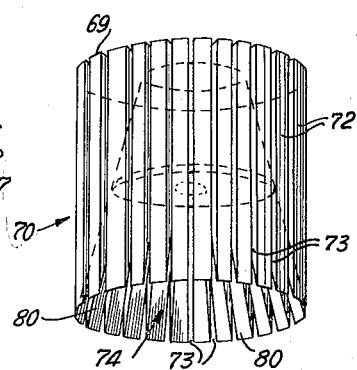

Additional objects and advantages of the invention will be readily apparent from the reading of the following description of a device constructed in accordance with the invention, and reference to the accompanying drawings thereof, wherein:

FIGURE 1 is a partly sectional view of a check valve embodying the invention;
FIGURE 2 is a perspective view of the support and seating element of the check valve shown in FIGURE 1;
FIGURE 3 is a perspective view of the closure element of the check valve shown in FIGURE 1;
FIGURE 4 is a sectional view of a modified form of the check valve shown in FIGURE 1;
FIGURE 5 is a sectional view of the closure element of the check valve shown in FIGURE 4; and,
FIGURE 6 is a perspective view of the support and seating element of the check valve shown in FIGURE 4.

Referring now particularly to FIGURES 1, 2, 3 and 4 of the drawings, the check valve 10 includes a cylindrical valve housing 11 having a threaded portion 12 at one end thereof whereby it may be connected to any suitable flow conductor through which the flow of fluid is to be controlled. The valve housing is enlarged intermediate its ends to provide an annular beveled stop shoulder 14 against which the support and seating element 15 may abut and which also provides an annular sealing surface 16 engageable by a closure element 17.

The support and seating element 15 has a beveled annular shoulder 19 at one end thereof for engaging and abutting the stop shoulder 14 of the valve housing and having a concave recess 20 in the opposite end for receiving the closure element 17. The exterior of the support and seating element is provided with a plurality of parallel circumferentially spaced longitudinally extending grooves or slots 22 which permit flow of fluid through the valve housing when the closure element is in retracted or open position as will be described more fully hereinafter.

The closure element 17 is a cup shaped structure having an intermediate frusto-conical surface 23 which merges into the convex surface 24 at one end and into the cylindrical surface 25 at its other larger end. The interior surface of the closure element includes a tapered or beveled surface 26 which extends from the concave surface 27 adjacent the convex outer surface 24. It will thus be apparent that the wall thickness of the closure element is taperingly reduced toward the mouth or outer end thereof to form a thin flexible annular lip whose outer surface is defined by the annular cylindrical surface 25. The outer cylindrical surface is normally in contact with the seating or seating surface 16 of the valve housing.

The concave recess 20 in the support and seating element has a bottom concave portion 28 which corresponds in configuration to the convex surface 24 of the closure element and an outwardly extending beveled or tapered sufrace 29 which corresponds in configuration with the conical surface 23 of the closure element whereby the surfaces 24 and 23 of the closure element abut the surfaces 28 and 29 which define the concave recess 20 of the support and seating element 15. The cylindrical surface 25 of the closure element extends outwardly of the forward end of the seating and support element 15 to engage the sealing surface 16 of the valve housing.

It will thus be apparent that the support and seating element engages the surfaces 23 and 24 of the closure element to support them against displacement and undue distortion, the support and seating element being preferably formed of metal and the closure element 17 being formed of any suitable flexible resilient material such as natural or artificial rubber or a suitable plastic.

The closure element 17 is retained in position in the seating and support element 15 by a nose member 32. The nose member has a reduced portion 33 threaded into the forward end of the valve housing 11 providing an annular stop shoulder 34 which abuts the outer end of the valve housing to limit the movement of the nose member into the valve housing. The nose member is provided with a central extension 36 which extends into the cup shaped closure element and has an end surface 37 convexly curved to correspond in configuration to the concave surface 27 of the closure element whereby the nose member 32 holds the closure member against longitudinal displacement in the support and seating element 15. The nose member is provided with a plurality of longitudinal flow passages 40 which communicate with the exterior and with the interior of the valve housing 11 and thus with the interior of the flow conductor 13 whereby fluids may flow from the fluid conductor into the valve housing and thence past the closure element into the flow passage 40 to the exterior.

In use, the check valve 10 permits flow of fluid from the fluid conductor 13 to the exterior but prevents reverse flow from the exterior into the flow conductor 13. It will be apparent that when the pressure within the flow conductor 13 is greater than the pressure exteriorly of the nose member 32, fluid will flow from the flow conductor 13 into the valve housing 11 and thence through the longitudinal peripheral grooves 22 of the support and seating element and past the cylindrical annular surface 25 of the closure element 23, which will be distorted or deflected inwardly out of contact with the sealing or seating surface 16 of the valve housing by the fluid, and then through the flow passages 40 of the nose section to the exterior. However, should the pressure in the flow conductor be less than the pressure exteriorly of the nose member, the pressure differential will cause the closure member to expand so that its cylindrical surface 25 will bear and abut against the sealing surface 16 and thus prevent reverse flow from the exterior into the flow conductor 13.

It will be apparent that the seating and support element 17 will prevent distortion and destruction of the closure element if the reverse pressures become very great since its surfaces 29 and 28 support the closure element over large surface areas thereof. It will also be apparent that the cylindrical surface 25 lies in the same cylindrical plane as the outer cylindrical surface 42 of the support and seating element 15 whereby fluid forces may not act on the outer lip of the closure element in such a manner as to tend to displace and distort it outwardly or rearwardly. It will also be apparent that the closure member element 17 has no apertures therein, such as are required in the closure element disclosed in my co-pending application, whereby leakage of fluids through such apertures is prevented. Moreover it will be apparent that the nose member of the valve housing holds the closure member firmly in the seating and support element 15.

Referring now particularly to FIGURES 4 through 6 of the drawings, the modified form of check valve 50 illustrated includes a valve housing 51 provided with a reduced forward end portion 52 which may be connected to any suitable flow conductor and a rear internally threaded portion 53 which threadedly receives an end plug 54. The end plug in turn is internally threaded as at 55 whereby the forward end of a flow conductor may be connected thereto. The end plug 54 is enlarged to provide an annular shoulder 56 which abuts the rear end of the housing 51.

Disposed between the forward annular wall 60 of the valve housing 51 and the forward internal end 61 of the end plug 54 is an insert sleeve 62. The insert sleeve is provided with an annular groove 63 wherein a suitable sealing member, such as an O ring 64, is disposed to seal between the insert sleeve 62 and the internal cylindrical wall 65 of the valve housing to prevent flow of fluid therebetween. The internal longitudinal bore of the insert sleeve 62 is reduced to provide an annular shoulder 68 against which abuts the rear end 69 of a support and seating element 70. The support element 70 has a cylindrical outer surface 72 provided with a plurality of parallel circumferentially spaced longitudinally extending grooves or slots 73 and a concave recess 74 in which is received the cup shaped closure element 75.

The closure element 75 is provided with an external frusto-conical wall surface 76 which extends from its base 77a and a forward cylindrical surface 77 which bears against the interior cylindrical sealing wall or surface 78 of the insert sleeve 62. The frusto-conical surface 76 is engaged and supported by the internal conical surface 80 of the support and seating element 70. The support and seating element is provided with a threaded bore to receive the bolt or retainer means 82 which extends through a suitable aperture in the base 77a of the closure element is detachably secured to the support and seating element. The support and seating element 70 may be rigidly held within the insert sleeve 62 by any suitable means, as by a set screw 85 which extends through a threaded bore in the insert sleeve into engagement with the support and seating element. It will be apparent that the insert sleeve forms a tubular housing means for the support and seating element 70 and the cup shaped closure element or member 75, that the sleeve insert has a shoulder 68 in its bore and that the valve housing 51 forms a removable apertured closure for the insert sleeve at the end opposite the shoulder.

It will be apparent that the mode of operation of the check valve 50 is similar to that of the check valve 10. In brief, when the pressure of the flow conductor connected to the end plug 55 is greater than the pressure in the flow conductor connected at the reduced forward end 52 of the valve housing, fluid will flow into the valve housing and into the insert sleeve 62 and then through the longitudinal grooves 73 of the support and seating element deflecting or distorting inwardly the forward lip portion of the closure element whereby the cylindrical surface 77 thereof moves inwardly out of engagement with the sealing and seating surface 78 of the insert sleeve 62 and thus permits fluid flow therepast. If, however, the pressure at the forward reduced end portion of the valve housing 52 is greater than the pressure in the flow conductor connected to the end plug 54, the closure element will be moved into its expanded position wherein the cylindrical surface 77 abuts, and seals with, the seating and sealing surface 78 of the insert sleeve 62 preventing flow of fluid through the check valve. The support and seating element, of course, will serve to prevent undue and undesired distortion of the closure element since its internal conical surface 80 engages the outer frusto-conical surface 76 of the closure element.

It will be apparent that the check valve 50 illustrated and described in FIGURES 4 through 6 readily lends itself to assembly in a flow conductor and that replacement of worn parts is easily accomplished. For example, should the closure element 75 become worn it may easily be replaced. Similarly if the sealing and seating surface 78 of the insert sleeve 62 becomes abraded or corroded a whole new assembly of an insert sleeve, a support and seating element, and a closure element may be inserted in place of the old or worn out assembly. The old or worn out assembly may then be taken to suitable location for salvage or repair of such parts as are salvageable.

It will now be seen that a new and improved check valve has been illustrated and described which includes a resilient closure member and a support and seating element for engaging the outer surfaces of the closure element to prevent its undue distortion when the closure element is in operative position preventing flow of fluid through a flow conductor.

It will also be apparent that the seating and support element is held in position in a valve housing by stop shoulders whereby it may not be provided with threads or other securing means which are easily corroded and damaged.

It will also be apparent that in the modified form of the check valve shown in FIGURES 4, 5 and 6 a complete assembly comprising an insert sleeve, a closure element and a support and seating element are removably positioned in a valve housing 51 and held therein by an end plug 54 whereby the whole valve assembly may be easily removed for replacement or repair.

It will also be seen that the closure element 75 is secured to the support and seating element 70 by means of a bolt which extends into a threaded bore in the seating and support element 70 but that the bore does not extend completely through the seating and support element whereby undesired flow of fluid is prevented.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. In a check valve: a tubular housing, a resilient cup shaped closure member, a seating and support element slidably and removably received in said tubular housing and having a concave recess, said seating and support element having a plurality of substantially radially disposed longitudinally extending slots provided therein extending inwardly from the outer periphery thereof to a point spaced between the axis of said element and the periphery thereof, said cup shaped closure member being disposed in said concave recess, said closure member having an outwardly flared flexible lip portion engageable with the walls of said seating and supporting element defining said concave recess adjacent the slots in said element and also having an outer portion extending outwardly of said seating and support element providing a cylindrical sealing surface disposed outwardly of the adjacent end of the seating and support element, whereby the flexible lip portion of the closure member overlies the ends of the slots at such end of the seating and support element, said slots exceeding twelve in number, said slots being smaller in width than the thickness of said another portion of said closure member, and means on said housing retaining said seating and support element and said closure member in place therein.

2. In a check valve: a tubular housing means having a shoulder in its bore and a removable apertured closure at the end opposite said shoulder, a resilient cup shaped closure member, a support and seating element slidably and removably mounted in the bore of said housing means between said shoulder and said removable apertured closure member, said element having a substantially conical concave recess, said cup shaped closure member being disposed in said concave recess, said closure member having a frusto-conical flexible lip portion engageable with the walls of said seating and support element defining said concave recess and also having an outer portion extending outwardly of said support and seating element providing a cylindrical sealing surface disposed outwardly beyond the adjacent end of the support and seating element, said support and seating element having a cylindrical outer surface provided with peripheral circumferentially spaced longitudinal grooves extending inwardly from the outer periphery thereof toward the axis thereof and providing a plurality of flow courses through said element and the flexible lip portion of said closure member overlying the ends of said grooves at the adjacent end of said support and seating element, said grooves being smaller in circumferential width than the thickness of said lip portion.

3. The device of claim 2 wherein said support and seating element has a threaded bore closed at one end and said closure element has an aperture; and retainer means extending through said aperture into said threaded bore for detachably securing said closure element to said seating and support element.

4. The device of claim 2 wherein said tubular housing means is insertable in said apertured closure, and means for securing said tubular housing means in said apertured closure.

5. The device of claim 2 wherein said tubular housing means is insertable in said apertured closure, means for securing said tubular housing means in said apertured closure, and sealing means for sealing between the tubular housing means and said apertured closure.

6. A check valve comprising: a housing having means providing an internal cylindrical sealing surface; a seating and support element slidably and removably disposed in said housing and having a cylindrical surface abutting said cylindrical surface of said valve housing; means in said housing holding said seating and support element in a predetermined position in said valve housing, said seating and support element having a concave recess in the forward end thereof; and a resilient closure member having a portion disposed in said concave recess and having a forward end portion extending forwardly of said seating and support element and having an annular outer cylindrical surface engageable with said cylindrical surface of said valve housing for sealing therebetween, said seating and support element having a plurality of peripheral longitudinal grooves exceeding twelve in number to permit flow of fluid through said valve housing, said closure member overlying the ends of said grooves, the width of said grooves being smaller than the thickness of said portion of said closure member disposed in said concave recess.

7. A check valve comprising: a housing having an internal cylindrical sealing surface; a seating and support element disposed in said housing and having a cylindrical surface abutting said cylindrical surface of said valve housing; means in said housing holding said seating and support element in a predetermined position in said valve housing, said seating and support element having a concave recess in the forward end thereof; and a resilient closure member disposed in said concave recess having a forward end portion extending forwardly of said seating and support element and having an annular outer cylindrical surface engageable with said cylindrical wall of said valve housing for sealing therebetween, said seating and support element having a plurality of peripheral longitudinal grooves to permit flow of fluid through said valve housing, said closure member overlying the ends of said grooves; and said holding means including a member connected to said valve housing engaging said closure member to hold it against displacement from said seating and support element.

8. A check valve comprising: a housing having an internal cylindrical sealing surface; a seating and support element disposed in said housing and having a cylindrical surface abutting said cylindrical surface of said valve housing; means in said housing holding said seating and support element in a predetermined position in said valve housing, said seating and support element having a concave recess in the forward end thereof; and a resilient closure member disposed in said concave recess having a forward end portion extending forwardly of said seating and support element and having an annular outer cylindrical surface engageable with said cylindrical wall of said valve housing for sealing therebetween, said seating and support element having a plurality of peripheral longitudinal grooves to permit flow of fluid through said valve housing, said grooves being narrower in width than the thickness of said closure member; and said holding means including a member connected to said valve housing engaging the said closure member to hold it against displacement from said seating and support element.

9. A check valve comprising: a housing having an internal cylindrical sealing surface; a seating and support element disposed in said housing and having a cylindrical surface abutting said cylindrical surface of said valve housing, said seating and support element having a plurality of longitudinally extending peripheral slots extending inwardly from said cylindrical surface; means in said housing limiting movement of said seating and support element in one direction in said valve housing, said seating and support member having a concave recess in the forward end thereof; a resilient closure member disposed in said concave recess having a forward end portion extending forwardly of such seating and support element and having an annular outer cylindrical surface engageable with said cylindrical wall of said valve housing for sealing therebetween; and a member connected to said valve housing and extending through said forward end portion for engaging said closure member to hold said closure member against displacement from said seating and support element and to limit movement of said seating and support element in said valve housing in a direction opposite to said one direction.

10. A check valve comprising: a housing having an internal cylindrical sealing surface; a seating and support element disposed in said housing and having a cylindrical surface abutting said cylindrical surface of said valve housing, said seating and support element having a plurality of peripheral grooves extending radially inwardly from said cylindrical surface; means in said housing limiting movement of said seating and support element in one direction in said valve housing, said seating and support element having a concave recess in the forward end thereof; a resilient closure member disposed in said concave recess having a forward end portion extending forwardly of such seating and support element and having an annular outer cylindrical surface engageable with said cylindrical wall of said valve housing for sealing therebetween; and a member connected to said valve housing engaging said closure member to hold said closure member against displacement from said seating and support element and to limit movement of said seating and support element in said valve housing in a direction opposite to said one direction, said member having a central extension extending into said closure member to engage said closure member.

11. A check valve comprising: a housing having an internal cylindrical sealing surface; a seating and support element disposed in said housing and having a cylindrical surface abutting said cylindrical surface of said valve housing, said seating and support element having peripheral grooves extending radially inwardly from said cylindrical surface; means in said housing limiting movement of said seating and support element in one direction in said valve housing, said seating and support element having a concave recess in the forward end thereof; a resilient closure member disposed in said concave recess having a forward end portion extending forwardly of such seating and support element and having an annular outer cylindrical surface engageable with said cylindrical wall of said valve housing for sealing therebetween; and a member connected to said valve housing engaging said closure member to hold said closure member against displacement from said seating and support element and to limit movement of said seating and support element in said valve housing in a direction opposite to said one direction, said member having a central extension extending into said closure member to engage said closure member, said member having a plurality of flow passages communicating with the interior of said valve housing forwardly of said closure member.

References Cited in the file of this patent
UNITED STATES PATENTS

| | | |
|---|---|---|
| 2,008,818 | Corbett | July 23, 1935 |
| 2,329,960 | Verheul | Sept. 21, 1943 |
| 2,859,771 | Blagg | Nov. 11, 1958 |

UNITED STATES PATENT OFFICE
CERTIFICATE OF CORRECTION

Patent No. 3,022,796                           February 27, 1962

Leslie L. Cummings

It is hereby certified that error appears in the above numbered patent requiring correction and that the said Letters Patent should read as corrected below.

Column 4, line 13, after "element" insert -- whereby the closure element --.

Signed and sealed this 10th day of July 1962.

(SEAL)
Attest:

ERNEST W. SWIDER
Attesting Officer

DAVID L. LADD
Commissioner of Patents